(12) United States Patent
Hellat et al.

(10) Patent No.: US 11,174,784 B2
(45) Date of Patent: Nov. 16, 2021

(54) METHOD OF OPERATING A GAS TURBINE POWER PLANT WITH EXHAUST GAS RECIRCULATION AND CORRESPONDING GAS TURBINE POWER PLANT

(71) Applicant: ANSALDO ENERGIA SWITZERLAND AG, Baden (CH)

(72) Inventors: Jaan Hellat, Zumikon (CH); Eribert Benz, Birmenstorf (CH); Frank Graf, Nussbaumen (CH); Torsten Wind, Hallwil (CH); Felix Guethe, Basel (CH); Klaus Doebbeling, Windisch (CH)

(73) Assignee: ANSALDO ENERGIA SWITZEERLAND AG, Baden (CH)

( * ) Notice: Subject to any disclaimer, the term of this patent is extended or adjusted under 35 U.S.C. 154(b) by 427 days.

(21) Appl. No.: 15/858,295

(22) Filed: Dec. 29, 2017

(65) Prior Publication Data

US 2018/0119612 A1 May 3, 2018

Related U.S. Application Data

(60) Division of application No. 14/467,500, filed on Aug. 25, 2014, now Pat. No. 9,856,792, which is a
(Continued)

(30) Foreign Application Priority Data

Feb. 29, 2012 (CH) .................................. 00273/12

(51) Int. Cl.
*F02C 3/30* (2006.01)
*F01D 5/14* (2006.01)
(Continued)

(52) U.S. Cl.
CPC ................ *F02C 3/30* (2013.01); *F01D 5/141* (2013.01); *F02C 3/06* (2013.01); *F02C 3/34* (2013.01);
(Continued)

(58) Field of Classification Search
CPC .... F02C 3/06; F02C 3/064; F02C 3/30; F02C 3/34; F02C 6/06; F02C 6/18; F02C 7/04;
(Continued)

(56) References Cited

U.S. PATENT DOCUMENTS 4,133,171 A   1/1979   Earnest et al.
5,611,197 A * 3/1997   Bunker .................... F02C 7/224
                                                    60/806
(Continued)

FOREIGN PATENT DOCUMENTS

CN    101457693 A    6/2009
CN    101845994 A    9/2010
(Continued)

*Primary Examiner* — Arun Goyal
(74) *Attorney, Agent, or Firm* — Buchanan Ingersoll & Rooney PC (57) ABSTRACT

An exemplary gas turbine power plant includes a gas turbine with a compressor having a compressor inlet. A combustion chamber follows the compressor and a turbine follows the combustion chamber. A cross section of the compressor inlet includes an inner sector and an outer sector in relation to the axis of rotation of the compressor. A plurality of feed ducts introduces oxygen-reduced gas into the inner sector of the compressor inlet. The plurality of feed ducts is arranged in the compressor inlet so as to be distributed in a circumferential direction on a circle concentrically with respect to the axis of the gas turbine.

7 Claims, 5 Drawing Sheets

Related U.S. Application Data continuation of application No. PCT/EP2013/054022, filed on Feb. 28, 2013.

(51) Int. Cl.
*F02C 3/34* (2006.01)
*F02C 6/00* (2006.01)
*F02C 6/08* (2006.01)
*F02C 6/18* (2006.01)
*F02C 7/04* (2006.01)
*F02C 3/06* (2006.01)

(52) U.S. Cl.
CPC ................ *F02C 6/003* (2013.01); *F02C 6/08* (2013.01); *F02C 6/18* (2013.01); *F02C 7/04* (2013.01)

(58) Field of Classification Search
CPC . F02C 7/08; F01D 5/043; F01D 5/141; F02M 26/13; F02M 26/17; F02M 26/19; F02M 26/20; F02M 35/10; F02M 35/108
See application file for complete search history.

(56) References Cited

U.S. PATENT DOCUMENTS

| | | |
|---|---|---|
| 6,308,513 B1 | 10/2001 | Hatanaka |
| 7,353,655 B2 | 4/2008 | Bolis et al. |
| 7,536,252 B1 | 5/2009 | Hibshman, II et al. |
| 7,926,256 B2 | 4/2011 | Draper et al. |
| 8,056,338 B2 | 11/2011 | Joergl et al. |
| 8,408,006 B2 | 4/2013 | Li et al. |
| 8,572,944 B2 | 11/2013 | Chillar et al. |
| 9,297,311 B2 | 3/2016 | Hellat et al. |
| 2009/0150056 A1 | 6/2009 | Hibshman, II et al. |
| 2010/0180565 A1 | 7/2010 | Draper |
| 2011/0302922 A1 | 12/2011 | Li et al. |

FOREIGN PATENT DOCUMENTS

| | | |
|---|---|---|
| CN | 102265004 A | 11/2011 |
| DE | 12 62 074 B | 2/1968 |
| EP | 0 718 470 A2 | 6/1996 |
| EP | 2 248 999 A1 | 11/2010 |
| JP | 5933767 B2 | 6/2016 |
| WO | 2010/142573 A2 | 12/2010 |

* cited by examiner

METHOD OF OPERATING A GAS TURBINE POWER PLANT WITH EXHAUST GAS RECIRCULATION AND CORRESPONDING GAS TURBINE POWER PLANT

CROSS-REFERENCE TO RELATED APPLICATIONS

The present application is a divisional of U.S. application Ser. No. 14/467,500, filed on Aug. 25, 2014, which claims the benefit of priority to International Patent Application No. PCT/EP2013/054022 filed Feb. 28, 2013, which claims priority to Swiss application 00273/12 filed Feb. 29, 2012. The content of each of U.S. application Ser. No. 14/467,500 and International Patent Application No. PCT/EP2013/054022 are hereby incorporated herein by reference in their entirety.

TECHNICAL FIELD

The present disclosure relates to a method for operating a gas turbine having two inlet flows of different gas compositions and to a gas turbine having a divided compressor inlet.

BACKGROUND

It is customary for a gas which is as homogeneous as possible to be delivered for compression to the compressor of gas turbines. In applications where gases of different composition are available, these are first intermixed and then delivered to the compressor. For example, in the recirculation of exhaust gases, use is made of an exhaust gas which has a gas composition deviating from fresh air. Recirculation is a technology which can basically be employed for the most diverse possible purposes in gas turbines. Thus, for example, for monitoring the emissions, for reducing the exhaust gas volume for the carbon dioxide separation, etc. In the recirculation of exhaust gases in a gas turbine, an appreciable fraction of the exhaust gas is branched off from the overall exhaust gas flow and normally, after cooling and purification, is delivered again to the inlet mass flow of the turbine or to the turbine compressor. The exhaust gas composition differs considerably from the composition of fresh ambient air. It is customary for the recirculated exhaust gas flow to be intermixed with fresh air from the surroundings and for this mixture subsequently to be delivered to the compressor.

Advantageously, by exhaust gas recirculation, the carbon dioxide partial pressure in the exhaust gases can be increased in order to reduce the power losses and efficiency losses at power plants with carbon dioxide separation. What has also been proposed is exhaust gas recirculation with the aim of reducing the oxygen content in the intake gases of gas turbines in order thereby to reduce the NOx emissions.

For exhaust gas recirculation, for example, U.S. Pat. No. 7,536,252 B1 describes a method for controlling an exhaust gas recirculation flow of a turbo machine which is returned to the inlet of the turbo machine via an exhaust gas recirculation system. In this method, a desired exhaust gas recirculation fraction which contains the fraction of the exhaust gas flow in the inlet flow of the turbo machine is determined, and the actual value is set to the desired value.

EP2248999 discloses a power plant with exhaust gas recirculation and also a method for operating a power plant of this type, in that the recirculation rate and the temperature to which the recirculated exhaust gases are recooled are regulated as a function of the load.

It is typically advantageous to achieve as high a recirculation rate as possible. The recirculation rate is typically limited by the requirements of the combustion chamber, since the oxygen content of the fuel gases otherwise becomes too low and complete, CO and UHC (unburned hydrocarbon)-free combustion cannot be ensured.

In the prior art, in order to ensure good combustion when the oxygen content of the fuel gases is low, the fresh air is intermixed as thoroughly as possible with the recirculated exhaust gases in order to make available a homogeneous gas mixture at the combustion chamber inlet. A mixer suitable for intermixing fresh air with recirculated exhaust gases so as to have a low pressure loss is known, for example, from WO2010/142573 A2.

The plant parts for exhaust gas recirculation, such as the mixer, recirculation lines, cooler for the recirculated exhaust gases, etc., are large and costly and require additional space in a power plant. They also lead to pressure losses and are detrimental to the power output and efficiency of the power plant.

SUMMARY

One aim of the present disclosure is to specify a method for the reliable operation of a gas turbine having two inlet flows of different gas compositions, in which the action of an oxygen-reduced inlet flow upon combustion is maximized. A gas turbine which is suitable for implementing the method is also the subject of the disclosure.

The disclosed method is distinguished in that, in a gas turbine, oxygen-reduced gas and fresh air are delivered separately such that the largest part of the oxygen-reduced gas reaches the combustion chamber of the gas turbine and fresh air is delivered such that as high a fraction as possible is routed past the combustion chamber. The gas turbine comprises a compressor with an inlet cross section, a combustion chamber which follows the compressor and in which the compressed gases are burnt by means of fuel, and a turbine in which the hot combustion gases are expanded.

What is designated as oxygen-reduced gas is a gas which has an oxygen concentration which is lower than the average oxygen concentration of the compressor intake flow. The oxygen concentration of the oxygen-reduced gas is typically at least 1% lower than the average oxygen concentration of the compressor intake flow, and preferably the oxygen concentration of the oxygen-reduced gas is at least 2% lower than the average oxygen concentration of the compressor intake flow.

According to one version of the method, an oxygen-reduced gas and fresh air are delivered to the compressor in a radially staged manner, the fresh air being delivered via an outer sector of the inlet cross section in relation to the axis of rotation of the compressor, and the oxygen-reduced gas being delivered via an inner sector of the inlet cross section in relation to the axis of rotation of the compressor.

According to one refinement of the method, the exhaust gases of the gas turbine are divided into a first exhaust gas flow for recirculation into the intake flow of the gas turbine and into a second exhaust gas flow for discharge into the surroundings, and the first exhaust gas flow is delivered as oxygen-reduced gas to the compressor via the inner sector of the intake cross section.

According to a further refinement of the method, at least 95% of the recirculated first exhaust gas flow is guided into the combustion chamber of the gas turbine, so that this percentage influences combustion.

Also, the fresh air can be introduced into the compressor inlet without being intermixed with the first exhaust gas flow. In this case, for the purpose of the cooling of hot gas parts, at least part of the fresh air compressed in the compressor is branched off as cooling gas.

By means of this method, the admixing of oxygen-reduced gas to the cooling air can be avoided or at least reduced. The oxygen concentration of the gases which reach the combustion chamber is thus reduced, as compared with a conventional method in which fresh air is first intermixed with oxygen-reduced gas and is then delivered to the compressor. This allows the use of a mass flow of gas which is lower than that of the prior art and which has a reduced oxygen fraction, in order to bring about a specific effect upon combustion.

The lower mass flow of oxygen-reduced gas makes it possible to reduce the plant size and therefore the plant and operating costs.

According to one refinement of the method, the fresh air is delivered to the compressor via an outer circular ring and the oxygen-reduced gas is delivered via an inner circular ring.

According to an alternative refinement of the method, the first exhaust gas flow is introduced via feeds arranged, upstream of the compressor inlet, so as to be distributed in the circumferential direction on a diameter of the intake duct concentrically with respect to the axis of rotation of the compressor. This makes it possible to regulate the recirculated exhaust gas quantity, without the flow field at the inlet into the compressor being greatly influenced by a rigid geometry which divides the inlet cross section.

Further, according to one version of the method, the oxygen content of the gas compressed by the compressor and introduced into the combustion chamber is held at least 3% below the average oxygen content of the cooling gases branched off from the compressor.

According to an alternative refinement of the method, the area ratio of the area of connection of the outer sector to the flow duct of the compressor to the area of connection of the inner sector to the flow duct of the compressor is varied by means of a regulating element. It is varied in this case such that the area ratio is matched to changes in the ratio between the delivered fresh air and the recirculated first exhaust gas flow.

According to a further refinement of the method, a lean gas is delivered as oxygen-reduced gas to the compressor via the inner sector of the intake cross section of the compressor.

What is defined as lean gas is a gas mixture with a methane concentration of less than 3% by volume (percent by volume). The methane concentration is typically held below 2% by volume. Lean gas arises, for example, when gas is sucked away from ventilated coalmines. In addition to the methane fraction, lean gases are typically composed mainly of air which is delivered to the mine for ventilation purposes.

Lean gases are usually often blown off directly into the surroundings, thus resulting in considerable environmental pollution, since methane is a strong greenhouse gas. Moreover, the energy content of the methane is lost without being used. By the proposed feed into a gas turbine, the methane is profitably burnt.

According to a further version of the method, the recirculated first exhaust gas flow and the lean gas are delivered to the compressor via the inner sector and fresh air is delivered via the outer sector.

Depending on the operating concept and the gas turbine, to start the gas turbine and when the latter is under part load exhaust gas recirculation is switched off or reduced. This is necessary, for example, in order to ensure stable, low-CO combustion (combustion low in carbon monoxide) or, during the ignition process, to avoid recirculation of unburnt fuel into the intake flow of the gas turbine. Depending on the separation of the inner and outer sector of the inlet cross section, a misaligned inflow the compressor may occur on account of a reduction in the recirculated exhaust gas flow. In order to avoid this misaligned flow, according to one version of the method, when the gas turbine is started or when the latter is under part load fresh air is admixed to the first exhaust gas flow before this is introduced into the compressor. The admixing of fresh air is regulated via a regulating element, for example a valve or flap. When exhaust gas recirculation is switched off, pure fresh air can be fed via this regulating element into the inner sector of the inlet cross section, so that a uniform flow toward the compressor is ensured.

In addition to the method, a gas turbine power plant for carrying out the method is the subject of the disclosure. A gas turbine power plant of this type comprises a gas turbine with a compressor inlet, with a compressor, with a combustion chamber following the compressor, and with a turbine following the combustion chamber. According to the disclosure, the compressor inlet, which the flow duct of the compressor follows, is divided into an inner sector and an outer sector, a feed for an oxygen-reduced gas being connected to the inner sector of the compressor inlet, and a fresh air feed being connected to the outer sector of the compressor inlet. In this case, the oxygen-reduced gas is a gas which has an oxygen concentration which is lower than the average oxygen concentration of the compressor intake flow during the operation of the gas turbine.

In one embodiment of the gas turbine power plant, the gas turbine power plant comprises an exhaust gas divider which is connected by means of a recirculation line to the inner sector of the compressor inlet for the recirculation of a first exhaust gas flow and which is connected to an exhaust gas line for the discharge of a second exhaust gas flow into the surroundings. The recirculated exhaust gas is introduced as oxygen-reduced gas into the compressor.

In a further embodiment of the gas turbine power plant, the inner sector and the outer sector are separated by an inlet guide plate. In yet a further refinement, the inner sector and the outer sector of the compressor inlet are designed as concentric circular rings at the connection to the flow duct of the compressor.

In order to ensure an optimal inflow to the compressor under the design conditions of the gas turbine power plant, according to one embodiment the area ratio of the area of connection of the outer sector to the flow duct of the compressor to the area of connection of the inner sector to the flow duct of the compressor is selected so as to be equal to the ratio of the volume flows of the delivered fresh air to the recirculated first exhaust gas flow under the design conditions of the gas turbine.

In a further embodiment of the gas turbine power plant, a regulating element is provided which varies the area ratio of the area of connection and which matches said area ratio to a possible change in the ratio between the delivered fresh air and the recirculated first exhaust gas flow. For this purpose, at least one partition between the fresh air feed and the feed of the recirculated first exhaust gas flow is designed to be flexible or displaceable.

Further, in one embodiment, the compressor inlet is divided into three or more sectors, via which selectively fresh air or recirculated exhaust gas can be delivered to the compressor. The sectors are in this case preferably arranged concentrically from an inner sector near the axis of rotation of the compressor outwardly. For example, with an increasing recirculated first exhaust gas flow, recirculated exhaust gas is delivered, commencing from the innermost sector to successively into the sectors, and the fresh air feed is restricted to the outer sector or sectors.

In one embodiment of the gas turbine power plant, a multiplicity of feed ducts are arranged so as to be distributed in a circumferential direction on a circle concentrically with respect to the axis of the gas turbine. These feed ducts are arranged for the purpose of introducing the oxygen-reduced gas into the inner sector of the compressor inlet in the latter near the axis of rotation of the compressor.

In a further embodiment of the gas turbine power plant, a regulating element is provided which allows the controlled admixing of fresh air to the recirculated first exhaust gas flow. This regulating element, to which ambient air is delivered via a line or an air duct, is, for example, a flap or a valve. In order to compensate the pressure losses of the regulating element and of feeding and admixing, a blower may be provided in the feed line.

In order to implement better separation of the intake air from the recirculated exhaust gases in the compressor, the first exhaust gas flow is preferably introduced, at a temperature higher than that of the fresh air, on the inside diameter of the compressor inlet, and the fresh air is introduced on the outside diameter. Since the density of the recirculated exhaust gases can be kept lower than the density of fresh air on account of the higher temperature, the density difference in the compressor results, because of the radial component of the flow velocity and the accompanying higher volume-specific centrifugal forces of the fresh air, in stratification in the compressor, or reduces the intermixing of the recirculated exhaust gas flow and fresh air in the compressor.

A large part of the cooling air of a gas turbine is typically branched off from the outer wall of the compressor casing via compressor extraction points. If, in a gas turbine of this type, the fresh air is delivered on the outside diameter of the compressor inlet and intermixing with fresh air is avoided, the fresh air is extracted in the compressor and is led past the combustion chamber as cooling gas, while a low-oxygen flow remains in the compressor and is delivered to the combustion chamber from the compressor outlet.

In order to reduce the intermixing of the first exhaust gas flow and the fresh air in the compressor, further, a compressor blade with a separating shroud segment for a gas turbine with exhaust gas recirculation is proposed. This compressor blade comprises a blade root and an airfoil, a separating shroud segment being arranged between the blade root and the free end, facing away from the blade root, of the airfoil. This separating shroud segment typically forms a right angle to the longitudinal axis of the blade. In the normal installation position, the separating shroud segments of all the blades of a compressor stage form an essentially closed circular ring lying perpendicularly to the axis of the gas turbine and in the compressor inhibit the intermixing of the recirculated first exhaust gas flow with fresh air.

Separating shroud segments may be provided on guide vanes and on moving blades. On account of the resulting increased centrifugal forces, in one embodiment separating shroud segments are provided on the guide vanes only.

In a further embodiment, in the case of at least one compressor stage, separating shroud segments are provided on the moving blades only and no separating shroud segments are provided on the guide vanes. This may be advantageous, for example, in the case of adjustable guide vanes, since, in the event of an adjustment of the guide vane position, the separating shroud segments of the guide vanes would run one to the other, or, if they are of shortened or rounded form in order to ensure adjustability, have an adverse influence upon the aerodynamic properties of the stage.

In a further embodiment, the separating shroud segments are provided only as far as the first or as far as the second compressor extraction point, since compressed oxygen-rich fresh air can be extracted effectively from the compressor as far as that point.

All the advantages explained can be used not only in the combinations specified in each case, but also in other combinations or alone, without departing from the scope of the disclosure. For example, a booster may be provided instead of the use of an exhaust gas blower.

The disclosure can be applied without restriction to gas turbines with a combustion chamber and to gas turbines with sequential combustion, such as are known, for example, from EP0718470.

BRIEF DESCRIPTION OF THE DRAWINGS

Preferred embodiments of the disclosure are described below by means of the drawings which serve merely for explanatory purposes and are not to be interpreted restrictively. In the drawings.

DETAILED DESCRIPTION

Figure 1:
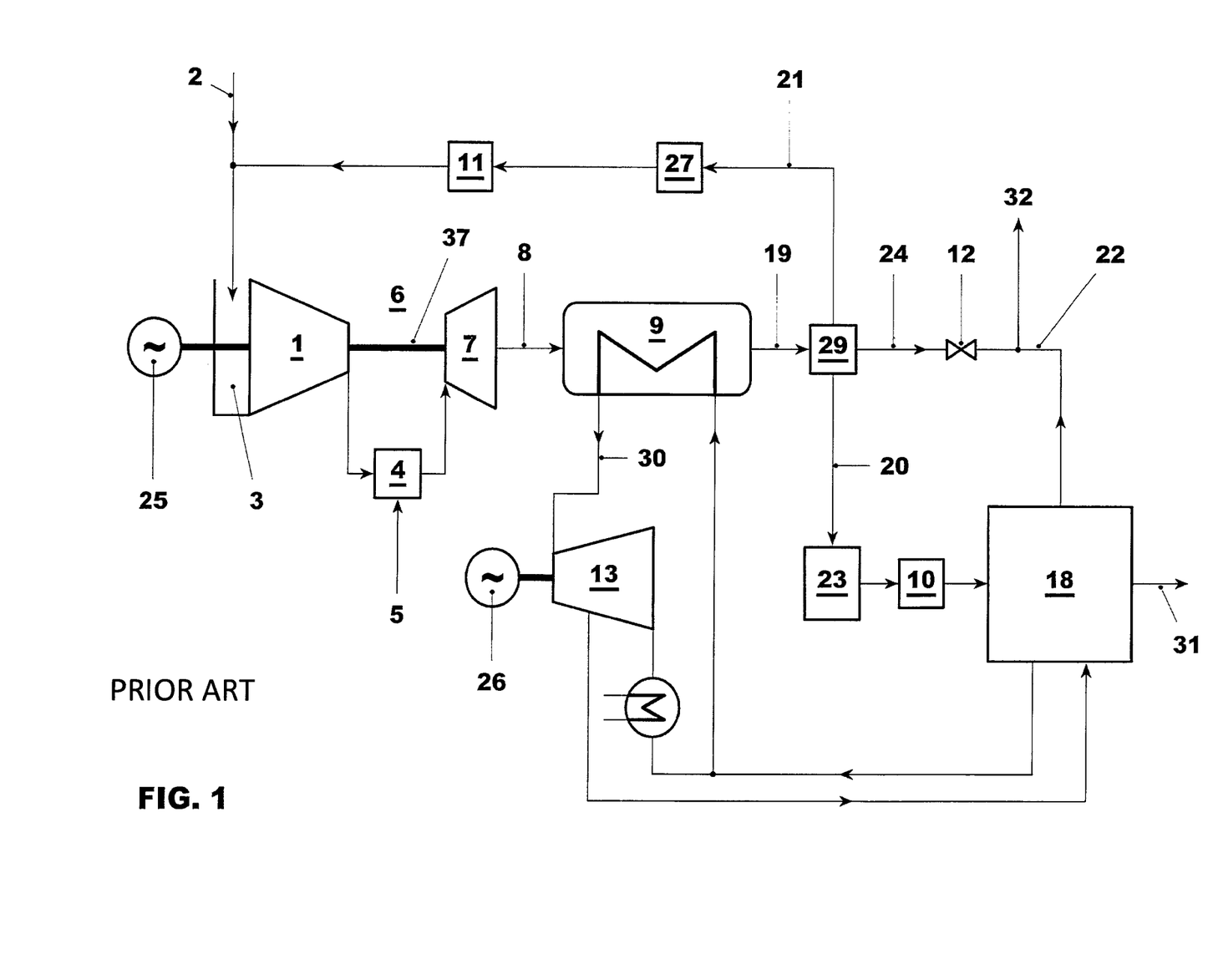
FIG. 1 shows a diagrammatic illustration of a gas turbine power plant with recirculation of the exhaust gases according to the prior art.

FIG. 1 shows a diagrammatic illustration of the essential elements of a gas turbine power plant. The gas turbine 6 comprises a compressor 1, and the combustion air compressed therein is delivered to a combustion chamber 4 and burnt there by means of fuel 5. The hot combustion gases are subsequently expanded in a turbine 7. The useful energy generated in the turbine 7 is then converted into electrical energy, for example, by means of a first generator 25 arranged on the same shaft 37.

The hot exhaust gases 8 emerging from the turbine 7, and so as to optimally utilize the energy still contained in them in a waste heat recovery steam generator 9 (HRSG), are employed to generate fresh steam 30 for a steam turbine 13 or for other plants. The useful energy generated in the steam turbine 13 is then converted into electrical energy, for example, by means of a second generator 26 arranged on the same shaft 37. The steam circuit is illustrated in the example in simplified form and merely diagrammatically. Various pressure stages, feed water pumps, etc., are not shown since these are not the subject of the invention.

In such a plant, the exhaust gases from the waste heat recovery steam generator 19 are divided into a first exhaust gas subflow 21 and a second exhaust gas subflow 20 downstream of the waste heat recovery steam generator 9 in an exhaust gas divider 29 which can be regulated. The first exhaust gas subflow 21 is returned to the intake line of the gas turbine 6 and intermixed there with fresh air 2. The non-returned second exhaust gas subflow 20 is discharged into the surroundings or, as in this example, is cooled further via an exhaust gas recooler 23 and delivered to a $CO_2$ separation system 18, Low-$CO_2$ exhaust gases 22 are discharged from the latter into the surroundings via a chimney 32. In order to overcome the pressure losses of the $CO_2$ separation system 18 and the exhaust gas line, an exhaust gas blower 10 may be provided. The $CO_2$ 31 separated in the $CO_2$ separation system 18 is typically compressed and diverted for storage or further treatment. The $CO_2$ separation system 18 is supplied via steam extraction with steam branched off from the steam turbine 13.

The second exhaust gas subflow may also be routed directly to the chimney 32 via an exhaust gas bypass 24 having a bypass flap 12.

The returned first exhaust gas flow 21 is cooled to somewhat above ambient temperature in an exhaust gas recooler 27 which may be equipped with a condenser. Downstream of this exhaust gas recooler 27, a booster or exhaust gas blower 11 for the recirculation flow 21 may be arranged. This returned exhaust gas flow 21 is intermixed with the fresh air 2 before the mixture is delivered as an intake flow via the compressor inlet 3 of the gas turbine 6.

Figure 2:
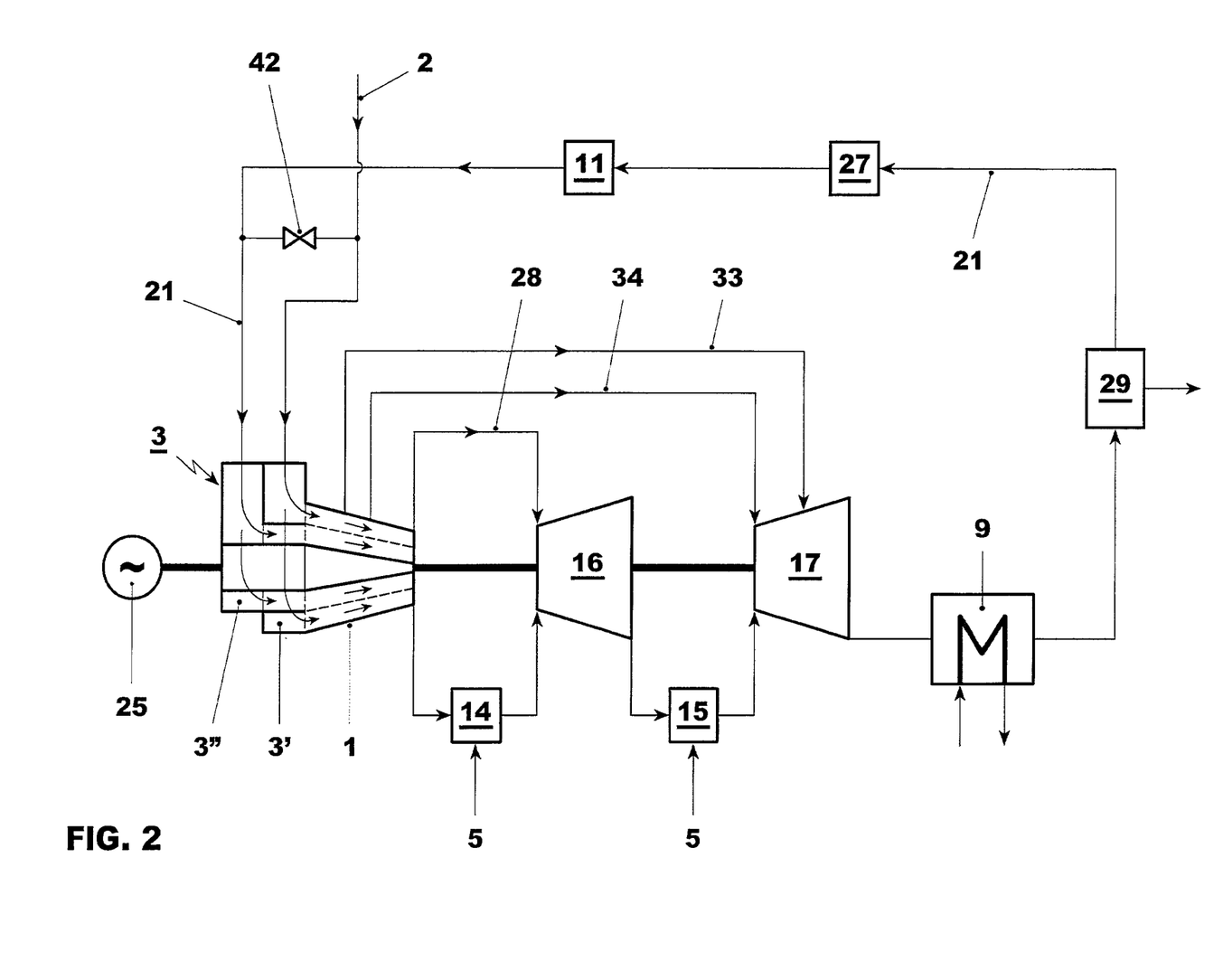
FIG. 2 shows a diagrammatic illustration of a gas turbine power plant with recirculation of the exhaust gases and with the coaxial introduction of exhaust gases and fresh air into the compressor.

In contrast to FIG. 1, a gas turbine with sequential combustion is illustrated in FIG. 2. The method can be applied to gas turbines with a combustion chamber and to gas turbines with sequential combustion. Versions for gas turbines with a combustion chamber and for gas turbines with sequential combustion are also possible correspondingly.

FIG. 2 shows diagrammatically an exemplary embodiment of a gas turbine power plant with a compressor inlet which is divided into two sectors, a feed for fresh air 2 issuing in an outer sector 3' of the compressor inlet 3 and a feed for an exhaust gas flow 21 issuing into an inner sector 3" of the compressor inlet 3.

The two inlet sectors 3', 3" directly follow the flow duct of the compressor 1 on that side of the compressor inlet 3 which faces the compressor. The outer sector 3' for fresh air in this case issues onto an outer annular area of the flow duct, and the inner sector 3" for exhaust gas recirculation issues onto an inner annular area of the flow duct.

Low-pressure and medium-pressure cooling gas 33, 34 is branched off from the radial outer wall of the compressor 1 and is delivered to the hot gas parts of the gas turbine for cooling purposes. Further, at the end of the compressor, high-pressure cooling gas 28 is branched off from the radial outer wall of the compressor or of the adjoining diffuser and is delivered to the hot gas parts of the gas turbine for cooling purposes. For the sake of simplification, FIG. 2 illustrates only a cooling gas feed to the high-pressure turbine 16 and to the low-pressure turbine 17. For the sake of simplification, a cooling gas feed to the combustion chambers 14, 15 is not illustrated, although the high-pressure combustion chamber 14 is typically cooled by high-pressure cooling air 28 and the low-pressure combustion chamber 15 typically cooled by medium-pressure cooling air 34. Since the oxygen-rich fresh air is guided into the region outside the compressor, a large part of said fresh air is routed as cooling gas 33, 34, 28 around the combustion chambers 14, 15, while the low-oxygen recirculated exhaust gases are compressed in the core region of the compressor 1 as far as the compressor end and enter the high-pressure combustion chamber 14. As a result of the separation of the gas feed in the compressor inlet 3, a large fraction of low-oxygen recirculated exhaust gases is guided into the high-pressure combustion chamber 14. The oxygen fraction in the inlet gases of the low-pressure combustion chamber 15 is thus also markedly reduced, as compared with a plant in which the recirculated exhaust gases 21 are intermixed with fresh air 2.

Figure 3:
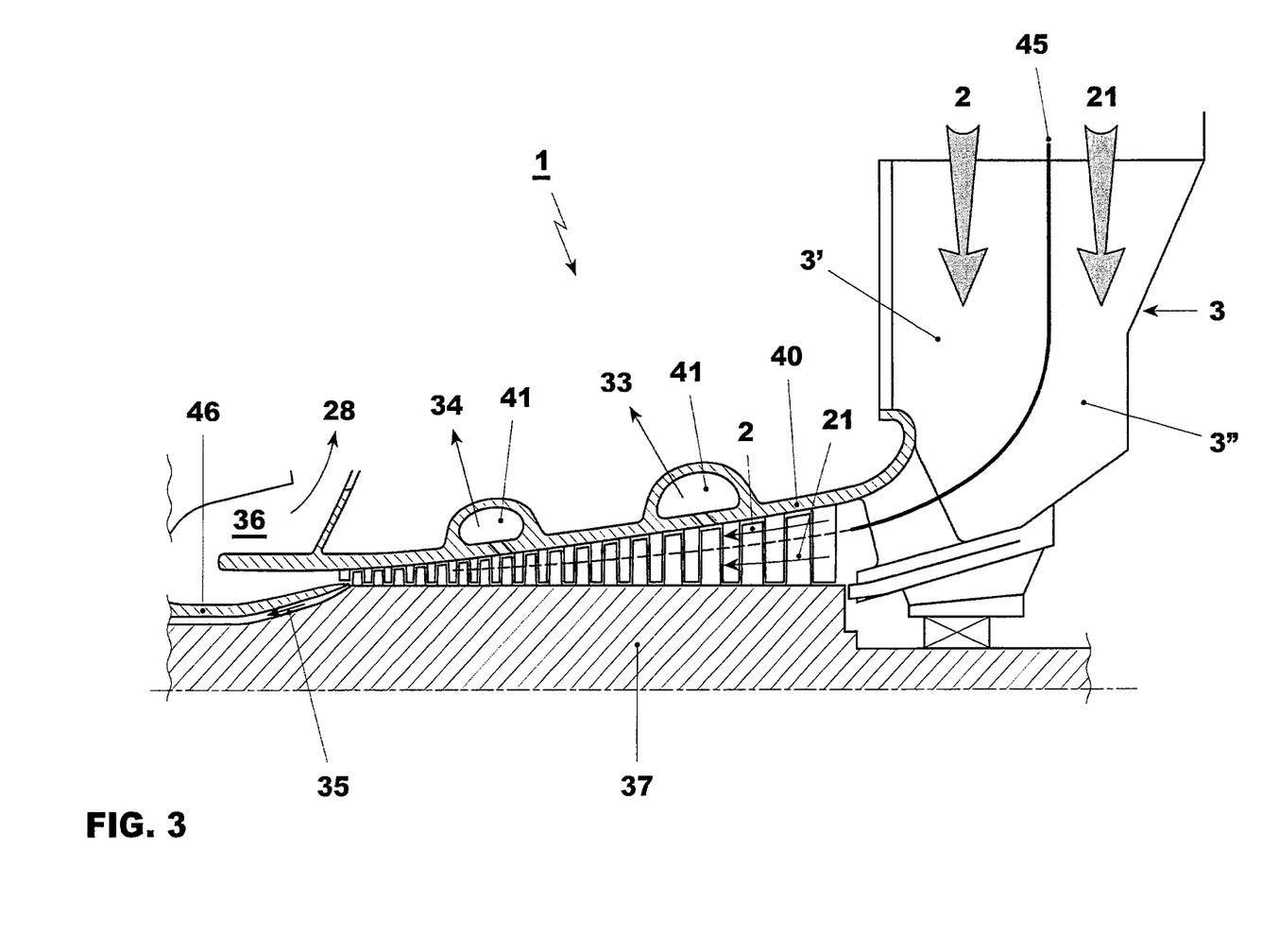
FIG. 3 shows a diagrammatic illustration of a divided compressor inlet and compressor of a gas turbine power plant with recirculation of the exhaust gases.

In order to implement a homogeneous velocity profile in the flow toward the compressor in various operating states of the gas turbine and the associated changes in the fraction of recirculated exhaust gas 21 and the compressor intake quantity, in the exemplary embodiment shown in FIG. 2 a regulating element 42 is provided, via which fresh air 2 is admixed to the first exhaust gas flow 21 before said fresh air is introduced into the compressor 1 via the inner sector 3" of the compressor inlet 3, FIG. 3 shows diagrammatically an exemplary embodiment of a divided compressor inlet and compressor of a gas turbine power plant with recirculation of the exhaust gases. In the example shown, the compressor inlet 3 is divided by an inlet guide plate 45 into an outer sector $3^1$ for fresh air 2 and an inner sector 3" for recirculated exhaust gases 21. This division of the compressor inlet 3 leads to an essentially coaxial inflow of recirculated exhaust gas 21 and fresh air into the compressor 1. In the example shown, the recirculated exhaust gases 21 are compressed in the compressor 1 by means of an annular space adjacent to the shaft 37 on the inside. The fresh air 2 is compressed in the compressor 1 in an annular space adjacent to the compressor casing 40 on the outside. In the example shown, gas for the secondary gas system of the gas turbine 6 is branched off via compressor extraction points 41 at two points in the compressor 1. The secondary gas is typically used for the cooling of hot gas parts and moreover, depending on the design, is used, for example, in the bearing region as scavenging or sealing gas. Low-pressure cooling gas 33 is branched off from the first extraction point 41 and medium-pressure cooling gas 34 is branched off from the second extraction point 41. High-pressure cooling gas 28 is branched off from the compressor plenum 36. High-pressure cooling gas 35 flows from the end of the compressor 1 into a channel between the shaft cover 46 and the shaft 37 in order to cool the shaft 37.

Even in the case of a coaxial feed of fresh air 2 and recirculated exhaust gas 21, intermixing of fresh air 2 and of recirculated exhaust gas 21 occurs on account of secondary flows in the compressor 1. This can reduce the positive effect of the separate feeding of fresh air 2 and recirculated exhaust gas 21 in the compressor inlet. In order to minimize this intermixing in the compressor 1, a compressor with blades having separating shroud segments is proposed.

Figure 4:
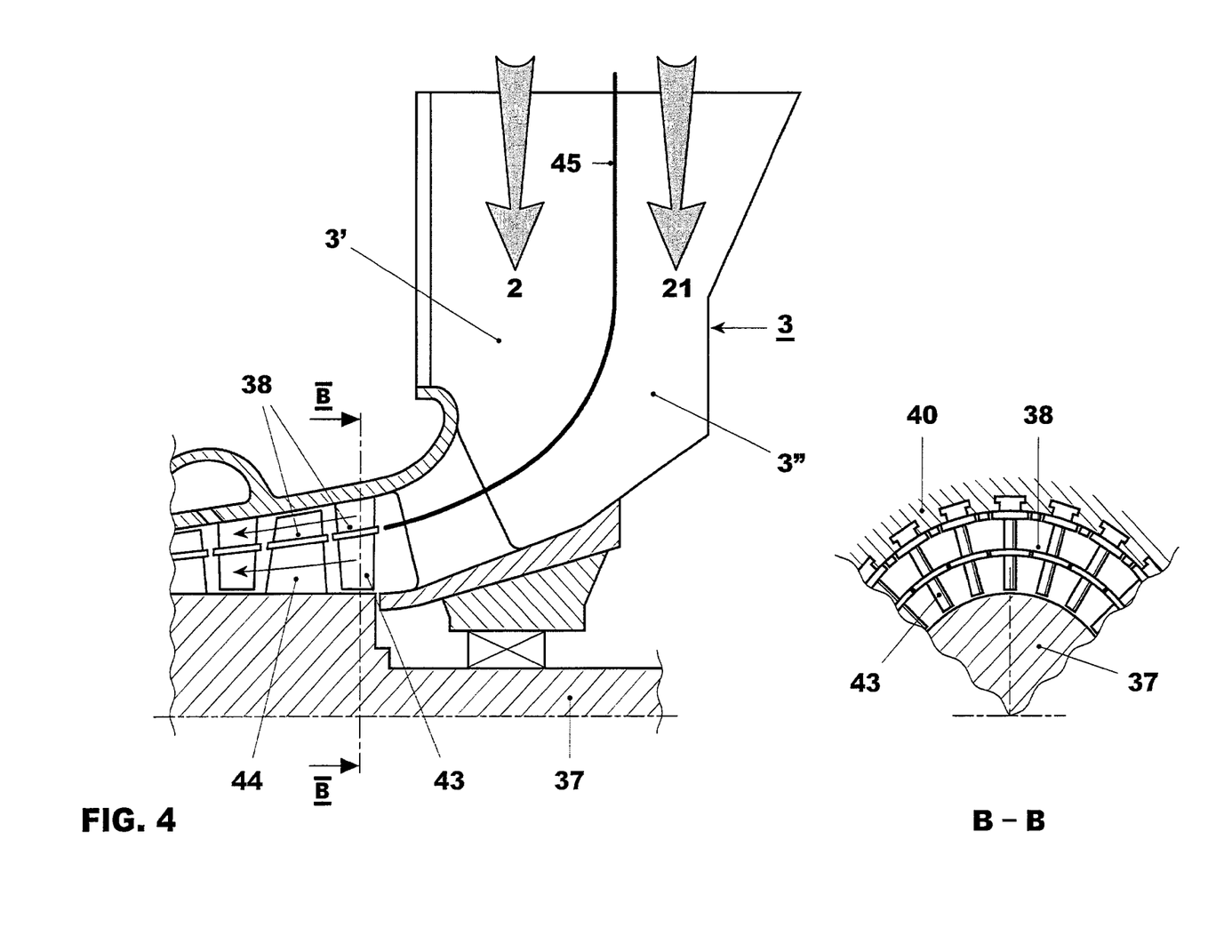
FIG. 4 shows a diagrammatic illustration of a detail of a compressor inlet and compressor of a gas turbine with recirculation of exhaust gases and with separating shroud segments on compressor guide vanes and compressor moving blades.

FIG. 4 shows an exemplary embodiment in which all the compressor guide vanes 43 and all the compressor moving blades 44 are designed with separating shroud segments 38 which, in the assembled state, join together at each stage to form a coherent separating shroud.

One version of a separating shroud is shown in section B-B by the example of the first compressor stage. In the example, at each moving blade, a separating shroud segment 38 is arranged at about 50% of the height of the airfoil and extends essentially perpendicularly with respect to the airfoil in the radial direction.

Figure 5:
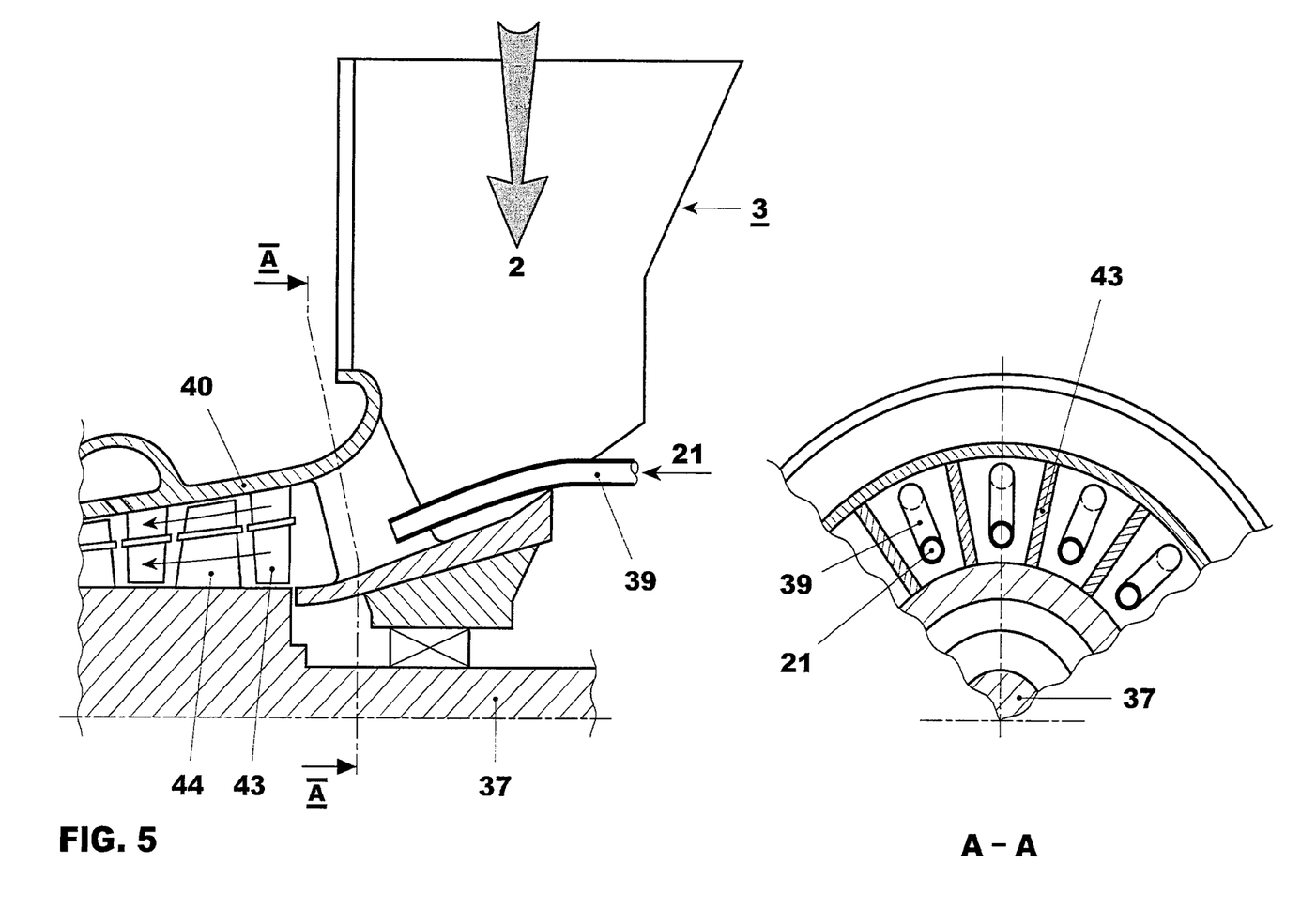
FIG. 5 shows a diagrammatic illustration of a compressor inlet and compressor of a gas turbine power plant with recirculation of the exhaust gases via a multiplicity of feed ducts arranged in the compressor inlet in the form of a circle about the gas turbine axis.

FIG. 5 shows an alternative feeding of the recirculated exhaust gases 21. Instead of separate feed of the recirculated exhaust gases 21 via an inner sector 3", partitioned off by a plate, of the compressor inlet for recirculated exhaust gases 21, an undivided compressor inlet 3 is used, into which the recirculated exhaust gases 21 are introduced via a multiplicity of feed ducts 39 arranged in the form of a ring axially on the inner wall of the compressor inlet 3. Suitable feed ducts 39 are, for example, pipes or pipe connection pieces, the outlet ends of which are oriented parallel to the main flow in the direction of the compressor inlet. In the example shown, the pipe connection pieces reach into the entry nozzle (bellmouth) of the compressor 1 in order to minimize intermixing with fresh air 2.

The pipe connection pieces may also end in the actual compressor inlet 3 or end even at the wall of the compressor inlet 3. The ends should preferably be arranged in the form of a ring about the axis of the gas turbine.

The version with a multiplicity of feed ducts 39 has the advantage that there is no need for an inlet guide plate 45 in order to separate the compressor inlet 3. The advantage of this, during operation, is that the ratio of fresh air to recirculated exhaust gas can be changed independently of the area ratio of the inlet sectors.

The invention claimed is:

1. A gas turbine power plant, comprising:
   a gas turbine including:
   a compressor having a compressor inlet and an outer wall disposed radially about an axis of rotation, the compressor inlet having an inner wall concentric with the axis of rotation; a separating shroud segment formed on a plurality of airfoils of a first compressor stage, the separating shroud segment separating an inner sector and an outer sector about the axis of rotation at the compressor inlet;
   a plurality of feed ducts arranged to introduce recirculated oxygen-reduced gas into the inner sector at the compressor inlet, wherein the plurality of feed ducts is arranged as a ring on the inner wall of the compressor inlet;
   a combustion chamber following the compressor and receiving at least the recirculated oxygen reduced gas from the compressor outlet after being compressed in the compressor; and
   a turbine following the combustion chamber, wherein the turbine receives high-pressure cooling gas branched from an extraction point at the outer sector of the compressor, and wherein the recirculated oxygen reduced gas is discharged from the turbine.

2. The gas turbine power plant according to claim 1, wherein the plurality of feed ducts include at least one of pipes and pipe connection pieces.

3. The gas turbine power plant according to claim 2, wherein the pipe connection pieces of at least one feed duct of the plurality of feed ducts extends past a wall of the compressor inlet and terminates in a space of the compressor inlet.

4. The gas turbine power plant according to claim 3, wherein termination ends of the pipe connection pieces of the plurality of feed ducts form a ring about the axis of rotation of the gas turbine.

5. The gas turbine power plant according to claim 2, wherein the pipe connection pieces of at least one feed duct of the plurality of feed ducts terminates at a wall of the compressor inlet.

6. The gas turbine power plant according to claim 1, wherein outlet ends of the plurality of feed ducts are parallel to a main flow in a direction of the compressor inlet.

7. The gas turbine power plant according to claim 1, wherein the compressor includes a plurality of guide vanes and a plurality of moving blades comprised of the plurality of airfoils, and wherein the shroud segment is attached to each guide vane of the plurality of guide vanes and each moving blade of the plurality of moving blades to separate a main flow from the inner sector and the outer sector of the compressor inlet.

* * * * *